United States Patent
Kruspe et al.

(10) Patent No.: US 8,373,412 B2
(45) Date of Patent: Feb. 12, 2013

(54) NMR-LWD IMAGING TOOL

(75) Inventors: Thomas Kruspe, Niedersachsen (DE); Martin Blanz, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 471 days.

(21) Appl. No.: 12/689,325

(22) Filed: Jan. 19, 2010

(65) Prior Publication Data

US 2010/0188080 A1 Jul. 29, 2010

Related U.S. Application Data

(60) Provisional application No. 61/146,851, filed on Jan. 23, 2009.

(51) Int. Cl.
*G01V 3/00* (2006.01)

(52) U.S. Cl. .................................................. 324/303

(58) Field of Classification Search ........... 324/300–322
See application file for complete search history.

(56) References Cited

U.S. PATENT DOCUMENTS

| | | |
|---|---|---|
| 2,779,885 A | 1/1957 | Reynst et al. |
| 3,083,335 A | 3/1963 | Schuster |
| 3,213,357 A | 10/1965 | Brown et al. |
| 3,223,898 A | 12/1965 | Bey |
| 3,289,072 A | 11/1966 | Schuster |
| 3,483,465 A | 12/1969 | Baker, Jr. |
| 3,597,681 A | 8/1971 | Huckabay et al. |
| 3,617,867 A | 11/1971 | Herzog |
| 3,667,035 A | 5/1972 | Slichter |
| 3,775,671 A | 11/1973 | Brown |
| 4,350,955 A | 9/1982 | Jackson et al. |
| 4,408,161 A | 10/1983 | Brown |
| 4,714,881 A | 12/1987 | Givens |
| 4,717,877 A | 1/1988 | Taicher et al. |
| 5,055,787 A | 10/1991 | Kleinberg et al. |
| 5,389,877 A | 2/1995 | Sezginer et al. |
| 5,459,263 A | 10/1995 | Floc'H et al. |
| 5,488,342 A | 1/1996 | Hanley |

(Continued)

FOREIGN PATENT DOCUMENTS

| | | |
|---|---|---|
| EP | 0581666 A2 | 7/1993 |
| EP | 0940688 A2 | 9/1999 |

(Continued)

OTHER PUBLICATIONS

Jay R. Porter et al.; A 16-Element Phased-Array Head Coil, 4th International Conference on Applications of Magnetic Resonance to Food Science, Sep. 7-9, 1998, pp. 272-279.
"An Improved Nuclear Magnetism Logging System and its Application to Formation Evaluation", Herrick, Couturie & Best, 1979 Annual Meeting of Society of Petroleum Engineers of AIME (SPE 8361), Sep. 23-26, 1979.

(Continued)

*Primary Examiner* — Dixomara Vargas
(74) *Attorney, Agent, or Firm* — Cantor Colburn LLP

(57) ABSTRACT

An apparatus for estimating a nuclear magnetic resonance (NMR) property of an earth formation penetrated by a borehole, the apparatus including: a logging tool having a source of a static magnetic field configured to polarize a region of investigation in the earth formation; a transmitter antenna disposed at the logging tool and configured to transmit electromagnetic energy into the region of investigation; at least one receiver sensor disposed at the logging tool and configured to receive NMR signals from the region of investigation in response to an interaction between the static magnetic field and the transmitted electromagnetic energy; and a processor configured to: receive the NMR signals from the at least one receiver sensor; associate the NMR signals received from the at least one receiver sensor with an azimuthal direction at which the NMR signals were received; and estimate the property from the NMR signals and the associated azimuthal directions.

21 Claims, 4 Drawing Sheets

U.S. PATENT DOCUMENTS

| | | | |
|---|---|---|---|
| 5,610,522 A | 3/1997 | Locatelli et al. | |
| 5,646,528 A | 7/1997 | Hanley | |
| 5,705,927 A | 1/1998 | Sezginer et al. | |
| 5,757,186 A | 5/1998 | Taicher et al. | |
| 5,977,768 A | 11/1999 | Sezginer et al. | |
| 6,018,243 A | 1/2000 | Taicher et al. | |
| 6,023,164 A | 2/2000 | Prammer | |
| 6,081,116 A * | 6/2000 | Wu et al. | 324/303 |
| 6,163,153 A | 12/2000 | Reiderman et al. | |
| 6,173,793 B1 | 1/2001 | Thompson et al. | |
| 6,255,817 B1 | 7/2001 | Poitzsch | |
| 6,268,726 B1 | 7/2001 | Prammer et al. | |
| 6,297,632 B1 | 10/2001 | Speier | |
| 6,326,784 B1 | 12/2001 | Ganesan et al. | |
| 6,373,248 B1 | 4/2002 | Poitzsch | |
| 6,437,564 B1 | 8/2002 | Itskovich et al. | |
| 6,459,262 B1 | 10/2002 | Wisler et al. | |
| 6,459,263 B2 | 10/2002 | Hawkes et al. | |
| 6,564,883 B2 | 5/2003 | Fredericks et al. | |
| 6,566,874 B1 | 5/2003 | Speier et al. | |
| 6,583,621 B2 | 6/2003 | Prammer et al. | |
| 6,720,765 B2 | 4/2004 | Edwards et al. | |
| 6,825,659 B2 | 11/2004 | Prammer et al. | |
| 6,844,728 B2 | 1/2005 | Speier et al. | |
| 7,012,426 B2 | 3/2006 | Edwards et al. | |
| 7,268,547 B2 | 9/2007 | Kruspe et al. | |
| 7,295,005 B2 | 11/2007 | Edwards | |
| 7,405,563 B2 * | 7/2008 | Kruspe et al. | 324/303 |
| 7,800,372 B2 * | 9/2010 | Peter et al. | 324/339 |
| 7,816,921 B2 * | 10/2010 | Peter et al. | 324/339 |
| 7,913,557 B2 * | 3/2011 | Vasques et al. | 73/152.55 |
| 2001/0043066 A1 | 11/2001 | Hawkes et al. | |
| 2002/0153888 A1 | 10/2002 | Kruspe et al. | |
| 2003/0132749 A1 | 7/2003 | Speier et al. | |
| 2003/0141869 A1 | 7/2003 | Prammer | |
| 2005/0030021 A1 | 2/2005 | Prammer et al. | |
| 2006/0132129 A1 | 6/2006 | Edwards | |

FOREIGN PATENT DOCUMENTS

| | | |
|---|---|---|
| EP | 0977057 A2 | 2/2000 |
| EP | 0981062 A2 | 2/2000 |
| GB | 2359632 | 12/2001 |
| GB | 2419418 A | 4/2006 |
| WO | 9936801 | 1/1999 |
| WO | 0107937 | 1/2001 |
| WO | 03016953 A1 | 2/2003 |
| WO | 2005036208 A2 | 4/2005 |

OTHER PUBLICATIONS

Cecil E. Hayes et al.; "Noise Correlations in Data Simultaneously Acquired from Multiple Surface Coil Arrays", Magnetic Resonance in Medicine 16, vol. 16 Issue 2, pp. 181-191, Nov. 18, 2005.

Brown, R. J. S. and G. W. Gamson. "Nuclear Magnetic Logging", Petroleum Transactions, AIME, vol. 219, Mar. 1960, pp. 199-207.

R.J. Alvarado et al., "Nuclear Magnetic Resonance Logging While Drilling," Oilfield Review (Aug. 2003). pp. 40-51.

A Timur—"Pulsed Nuclear Magnetic Resonance Studies of Porosity, Movable Fluid, and Permeability of Sandstones," Journal of Petroleum Technology, Jun. 1969, p. 775.

Fa-hsuan Lin et al.; Quantitative Spatial/Spectral Analysis of Magnetic Resonance Imaging Surface and Phased Array Coils of Arbitrary Geometry Based on Method of Moment, IEEE Transactions on Medical Imaging, vol. 18, No. 12, Dec. 1999, pp. 1129-1137.

L. J. Burnett and J. A. Jackson—"Remote (Inside-Out) NMR, II Sensitivity of NMR Detection for External Samples," Journal of Magnetic Resonance 41,406 ( May 1980).

J. A. Jackson, L. J. Burnett and J. F. Harmon—"Remote (Inside-Out) NMR, III, Detection of Nuclear Magnetic Resonance in a Remotely Produced Region of Homogeneous Magnetic Field," Journal of Magnetic Resonance 41,411 (May 1980).

R. K. Cooper and J. A. Jackson—"Remote (Inside-Out) NMR. I. Remote Production of a Region of Homogeneous Magnetic Field," Journal of Magnetic Resonance, 41,400 (May 1980).

Chris D. Constantinides et al.; Signal-to-Noise Measurements in Magnitude Images from NMR Phased Arrays, Proceedings—19th International Conference-IEEE/EMBS Oct. 30-Nov. 2, 1997; pp. 456-459.

Spadea, Jennifer R. et al. "Optimization of Printed Coil Arrays for Microscopic Imaging and Spectroscopy," Proceedings—19th International Conference—IEEE/EMBS Oct. 30-Nov. 2, 1997 Chicago, IL. USA.

Brown, Jackson & Koelle, "Western Gas Sands Project Los Alamos NMR Well Logging Tool Development", Los Alamos Scientific Laboratory Report LA-10374-PR, (Mar. 1985).

International Search Report and Written Opinion, Mailed Aug. 31, 2010, International Appln. No. PCT/US2010/021600, Written Opinion 3 pages, International Search Report 5 pages.

International Search Report and Written Opinion, Mailed Aug. 30, 2010, International Appln. No. PCT/US2010/021599, Written Opinion 4 pages, International Search Report 5 pages.

* cited by examiner

NMR-LWD IMAGING TOOL

CROSS REFERENCE TO RELATED APPLICATIONS

This application claims the benefit of an earlier filing date from U.S. Provisional Application Ser. No. 61/146,851 filed Jan. 23, 2009, the entire disclosure of which is incorporated herein by reference.

BACKGROUND OF THE INVENTION

The invention disclosed herein relates to the field of nuclear magnetic resonance (NMR) well logging apparatus and methods. More specifically, the invention is related to acquiring and processing NMR signals to estimate a particular property of an earth formation penetrated by a borehole.

Exploration and production of hydrocarbons generally requires precise and accurate measurements of earth formations, which may contain reservoirs of the hydrocarbons. Boreholes are typically drilled into the earth formations for the exploration and production.

Well logging is a technique used to perform measurements of an earth formation penetrated by a borehole. In one embodiment, referred to as logging-while-drilling (LWD), a logging tool is used to perform the measurements during drilling operations. The logging tool is attached to a drill string having a drill bit. Thus, as the drill string rotates to turn the drill bit, the logging tool also rotates with the drill string. Because of the rotation, most LWD measurements may then be averaged about the 360 degrees of rotation to produce a value of a property of the earth formation. Especially most LWD nuclear magnetic resonance (NMR) logging tools use axisymmetric magnetic fields. Despite the tool rotating with the drill string, the magnetic fields do not vary in the region of investigation and, hence, the rotation does not influence the NMR measurement. Thus, the tools yield an average of the formation property.

Many types of measurements may be performed with the well logging technique. One type of measurement measures the response of nuclei in the earth formation to a changing magnetic field in a technique known as nuclear magnetic resonance (NMR) measurements. NMR measurements in LWD applications are usually implicitly averaged about the 360 degrees of rotation to produce a measured NMR property assumed to be symmetric around the borehole at a certain depth. However, this assumption may not be accurate. Properties of the earth formation may not be symmetric around the borehole.

Therefore, what are needed are techniques that measure NMR properties of an earth formation where the NMR properties are asymmetric about the borehole. Preferably, the techniques associate an azimuthal direction with each NMR measurement.

BRIEF SUMMARY OF THE INVENTION

Disclosed is an apparatus for estimating a nuclear magnetic resonance (NMR) property of an earth formation penetrated by a borehole, the apparatus including: a logging tool; a source of a static magnetic field, the source being disposed at the logging tool and configured to polarize a region of investigation in the earth formation; a transmitter antenna disposed at the logging tool and configured to transmit electromagnetic energy into the region of investigation; at least one receiver sensor disposed at the logging tool and configured to receive NMR signals from the region of investigation in response to an interaction between the static magnetic field and the transmitted electromagnetic energy; and a processor configured to: receive the NMR signals from the at least one receiver sensor; associate the NMR signals received from the at least one receiver sensor with an azimuthal direction at which the NMR signals were received; and estimate the property from the NMR signals and the associated azimuthal direction(s).

Also disclosed is a method for estimating a nuclear magnetic resonance (NMR) property of an earth formation penetrated by a borehole, the method including: conveying a logging tool through the borehole; generating a static magnetic field in a region of investigation in the earth formation with the logging tool, the static magnetic field being configured to polarize the region of investigation; transmitting electromagnetic energy into the region of investigation with the logging tool; receiving NMR signals with at least one receiver sensor disposed at the logging tool from the region of investigation in response to an interaction between NMR signals and the static magnetic field and the transmitted electromagnetic energy; associating the NMR signals received from the at least one receiver sensor with an azimuthal direction at which the NMR signals were received; and estimating the property from the NMR signals and the associated azimuthal direction(s).

Further disclosed is a machine-readable medium comprising machine-executable instructions for estimating a nuclear magnetic resonance (NMR) property of an earth formation penetrated by a borehole by implementing a method including: receiving NMR signals with at least one receiver sensor from a region of investigation in the earth formation; associating the NMR signals received from the at least one receiver sensor with an azimuthal direction at which the NMR signals were received; and estimating the property from the NMR signals and the associated azimuthal direction(s).

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
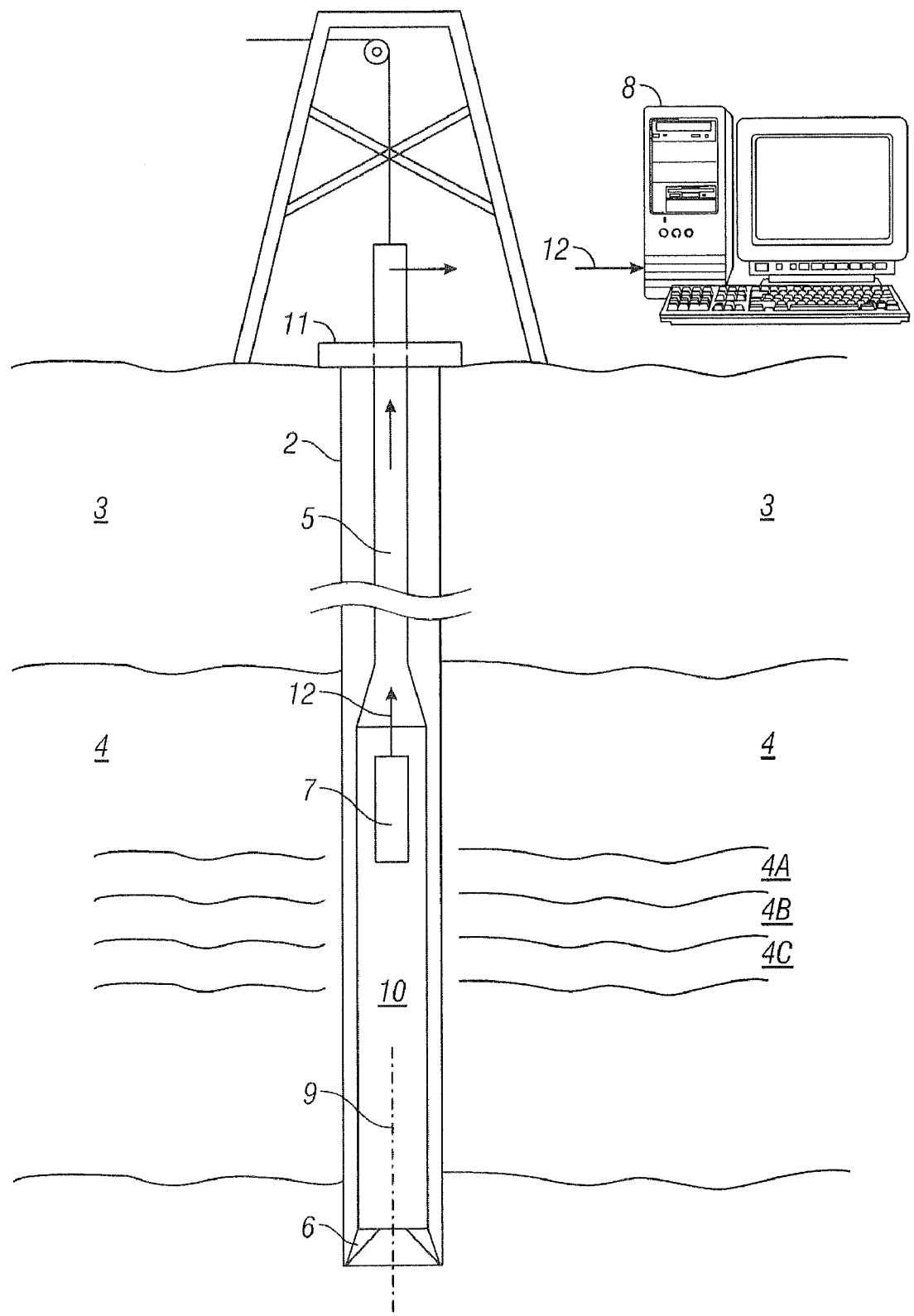
FIG. 1 illustrates an exemplary embodiment of a logging tool disposed in a borehole penetrating the earth.

Disclosed are embodiments of techniques for measuring asymmetrical nuclear magnetic resonance (NMR) properties of an earth formation penetrated by a borehole. The techniques disclose a logging tool for measuring the asymmetrical NMR properties and associating an azimuthal direction with the NMR measurements. The techniques also disclose a method for using the logging tool.

The techniques call for an NMR logging tool having at least one transmitter antenna coupled to a transmitter and one or more receiver antennas disposed about a circumference or perimeter of the tool. Each receiver antenna is coupled to an associated receiver, which generally includes a receiver amplifier. Each receiver antenna is configured to have a receiver field orientation that is perpendicular to both a static magnetic field and a magnetic field generated by the transmitter antenna in a region of investigation. The orientation of the receiver field of each receiver antenna is aimed in a circumferential direction around the borehole in the region of investigation in the earth formation. Each receiving antenna is associated with an azimuth, which also depends on the tool face. Thus, associated with the NMR signals received at each receiver antenna for each region of investigation are (1) a depth in the borehole at which the NMR signals were received, (2) an azimuth to the region of investigation, and (3) a radial depth or distance to the region of investigation from the borehole. With these three types of information associated with the NMR signals, a three-dimensional image (or visual display of NMR properties) can be created for a range of depths in the borehole. With two types of information such as (1) and (2) associated with the NMR signals, a two-dimensional image can be created.

One advantage of the logging tool disclosed herein is that the receiver antenna(s) is/are inductively decoupled from the transmitting antenna because the two antennas are oriented orthogonally to each other. This lack of direct coupling precludes the need for a decoupling transformer to cancel the voltage coupled from the transmitter antenna to the receiver antenna to avoid overloading of the associated receiver amplifier.

For convenience, certain definitions are now presented. The term "azimuthal direction" relates to a direction that is radial to the borehole at a certain angle when viewed from along the axis of the borehole. The term "NMR measurements" relates to spin-echo measurements or other nuclear magnetic resonance measurements of nuclei in a material in the earth formation. In general, the nuclei are polarized by a static magnetic field. The nuclei are then "tipped" from their polarized positions by a pulse of electromagnetic energy, generally in the radio frequency (RF) range, and allowed to precess and relax towards their polarized positions. The nuclei emit electromagnetic energy referred to as "NMR signals" during their precession in relation to a characteristic of the earth formation. The NMR signals are measured and associated with the characteristic. The term "receiver sensor" relates to a device configured to receive the NMR signals. Non-limiting examples of a receiver sensor include an antenna, an inductive coil, and a magnetic sensor such as an atomic magnetometer. The term "winding" relates to one or more turns of a conductor generally forming a coil that may be used as an antenna. When the winding has more than one turn, the winding may be referred to as a solenoid. Associated with the winding is an axis that defines the orientation of the coil. If the winding is wrapped around a cylinder, then the axis is the longitudinal axis of the cylinder.

Various parameters may be selected for conducting the NMR measurements depending on a characteristic of interest in the earth formation. In addition, a sequence of the RF pulses known as Carr-Purcell-Meiboom-Gill (CPMG) spin-echo measurement sequences may be used in the NMR measurements. Non-limiting examples of these parameters include wait time between individual CPMG spin-echo measurements, interecho spacing time for the CPMG sequences, magnitude of the static magnetic field, and frequency, magnitude, and duration of the RF magnetic field pulses.

Various parameters of the NMR signals may be measured to estimate a characteristic of the earth formation. Non-limiting examples of these parameters include longitudinal relaxation time constant ($T_1$), transverse relaxation time constant ($T_2$), and parameters related to these time constants.

Reference may now be had to FIG. 1. FIG. 1 illustrates an exemplary embodiment of a logging tool 10 disposed in a borehole 2 penetrating the earth 3. The earth 3 includes an earth formation 4, which can include various layers 4A-4C. The logging tool 10 is configured to perform NMR measurements of the earth formation 4 from within the borehole 2. In the embodiment of FIG. 1, the logging tool 10 is configured to perform the NMR measurements during logging-while-drilling (LWD) operations. Accordingly, the logging tool 10 is attached to a drill string 5 that includes a cutting device 6. The drill string 5 is rotated by a rotating device 11. As the drill string 5 rotates to turn the cutting device 6, the logging tool 10 also rotates. For reference, the logging tool 10 has a longitudinal axis 9.

The term "formation" relates to material outside the borehole. The formation can include mud filtrate that has ingressed into the formation.

Referring to FIG. 1, an electronic unit 7 is disposed at the logging tool 10. The electronic unit 7 can be configured to operate the logging tool 10 to perform the NMR measurements or to process NMR data 12 obtained from the NMR measurements. In addition, the logging tool 10 can be configured to record the NMR data 12 for later retrieval when the logging tool 10 is removed from the borehole 2 or to transmit the NMR data 12 to a processing system 8 located at the surface of the earth 3. When transmitted to the processing system 8, the data 12 can be transmitted in real time via a high-speed telemetry system such as a wired pipe system. But other telemetry methods (e.g., mud pulsing) are possible too.

Figure 2A:
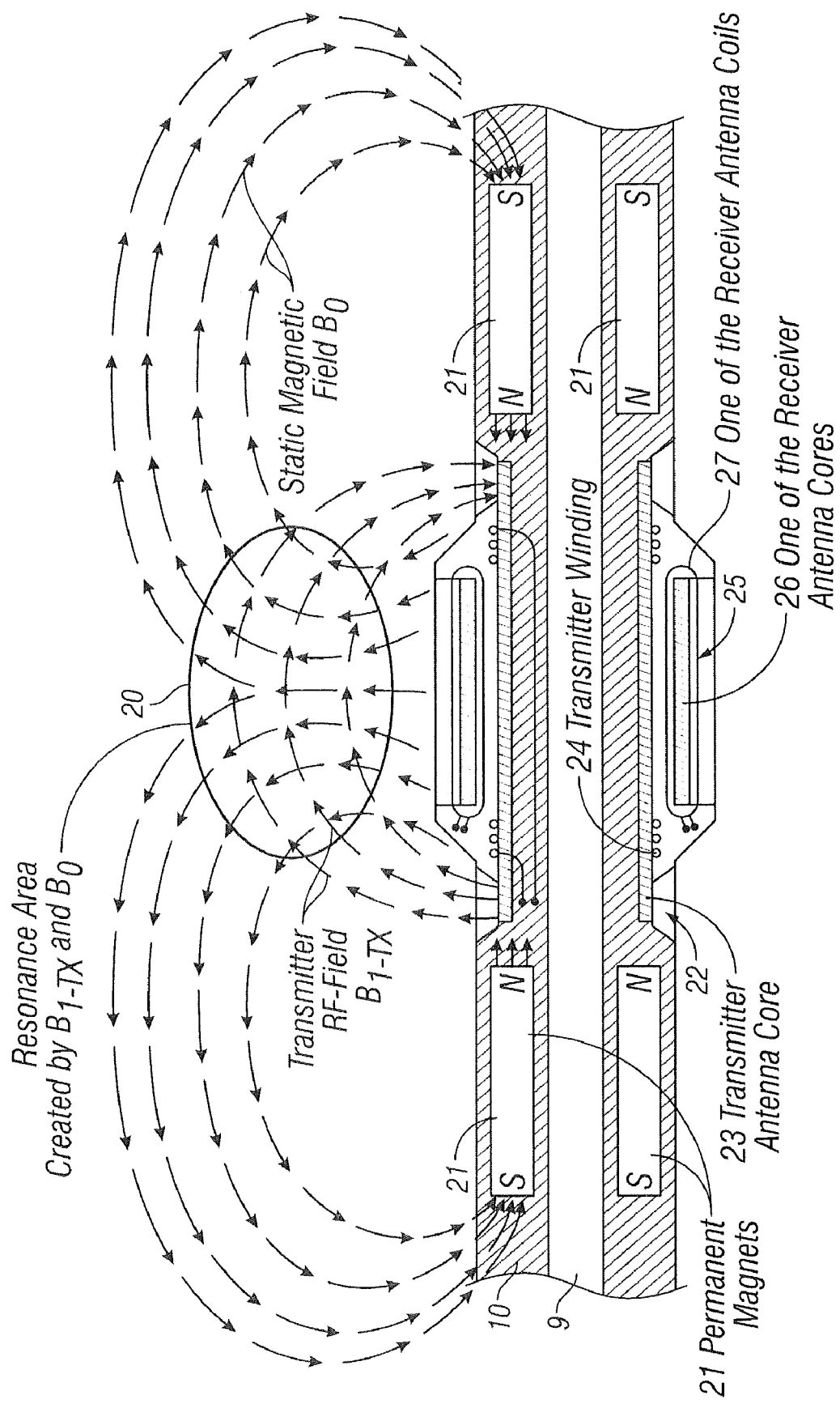
FIG. 2A and FIG. 2B, collectively referred to herein as FIG. 2, depict aspects of the logging instrument configured to perform asymmetrical nuclear magnetic resonance (NMR) measurements in a logging-while-drilling application.

FIG. 2 depicts aspects of the logging tool 10. FIG. 2A illustrates a cross-sectional side view of a section of the logging tool 10. Also illustrated in FIG. 2A is a zone of investigation 20 in the earth formation 4. The zone of investigation 20 is interrogated by the tool 10 to determine an NMR property and an azimuthal direction associated with the NMR property. Referring to FIG. 2A, the logging tool 10 includes a source 21 of a static magnetic field $B_0$. The static magnetic field $B_0$ in the zone of investigation 20 is substantially perpendicular to the longitudinal axis 9 of the tool 10. In one embodiment, the source 21 is a permanent magnet. In another embodiment, the source 21 can be an electromagnet.

Referring to FIG. 2A, the logging tool 10 includes a transmitter 22. The transmitter 22 transmits electromagnetic energy generally in the radio frequency (RF) range into the zone of investigation 20 to generate a magnetic field $B_{1-TX}$. The magnetic field $B_{1-TX}$ in the zone of investigation 20 is substantially parallel to the longitudinal axis 9. The transmitter 22 in the embodiment of FIG. 2 includes a transmitter antenna core 23 and transmitter winding 24 wrapped around the transmitter antenna core 23. The transmitter antenna core 23 has a cylindrical shape that is concentric with and parallel to the longitudinal axis 9. The transmitter winding 24 may also form one or more solenoids with their axis substantially parallel to the longitudinal axis 9.

Referring to FIG. 2A, the logging tool 10 includes a plurality of receiver antennas 25. Each receiver antenna 25 in the embodiment of FIG. 2 includes a receiver antenna core 26 and receiver antenna coil 27 wrapped around the receiver antenna core 26. The axis of the receiver antenna coil 27 is oriented as a tangent to the circumference of the logging tool 10. Also, the longitudinal axis to the receiver core 26 is oriented as a tangent to a circumference of the logging tool 10 as shown in FIG. 2B.

Figure 2B:
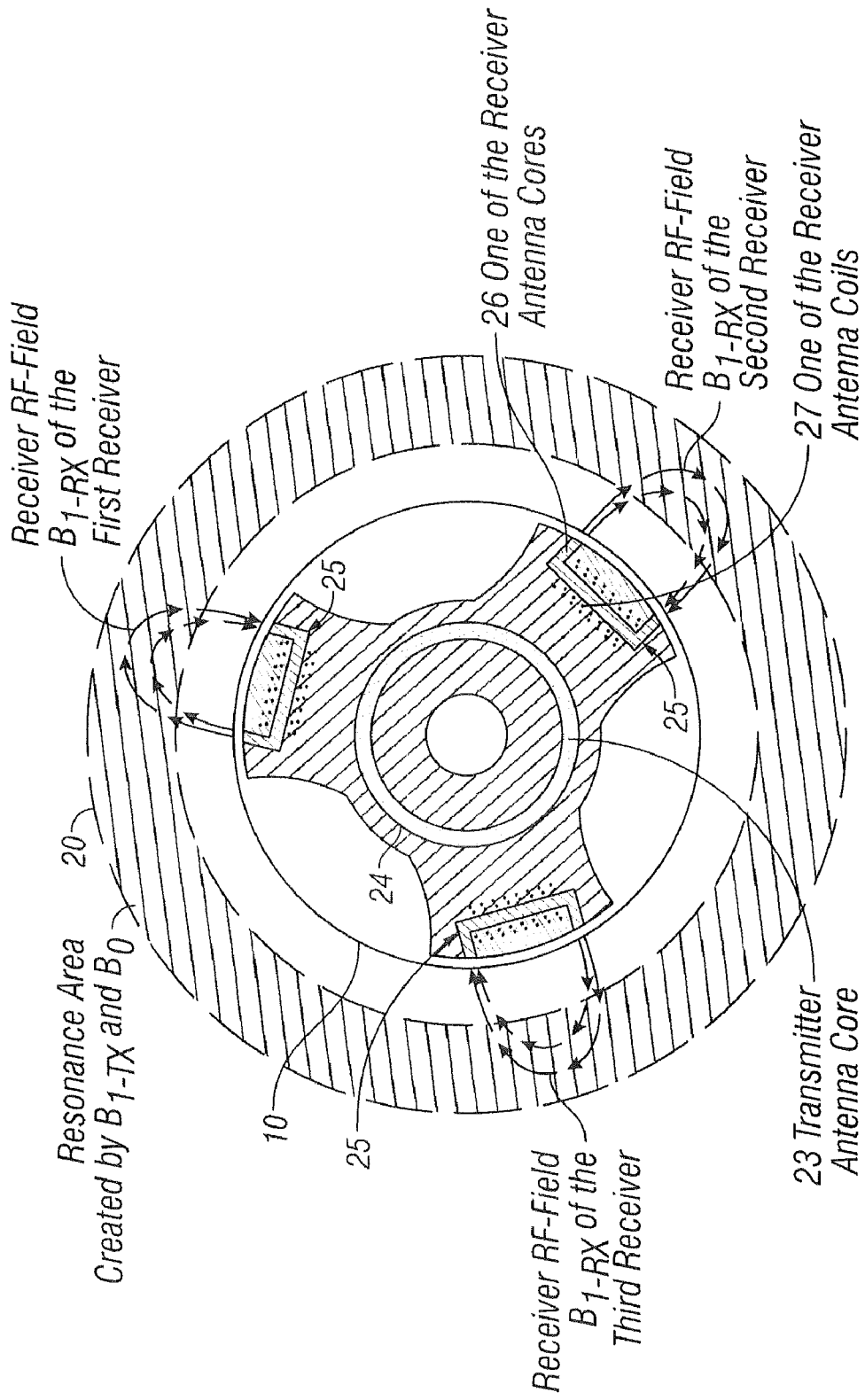

FIG. 2B illustrates a cross-sectional top view of the logging instrument 10. As shown in FIG. 2B, associated with each receiver antenna 25 is a receiver RF field $B_{1-RX}$. Each receiver RF field $B_{1-RX}$ is configured to intersect the region of investigation 20. Thus, each receiver RF field $B_{1\text{-}RX}$ is sensitive to receiving NMR signals, generally in the RF range, from the region of investigation 20. The NMR signals are in response to the static magnetic field $B_0$ and the transmitted magnetic field $B_{1\text{-}TX}$ interacting with the nuclear spins of interest in the region of investigation 20. The interacting causes tipping of the nuclei in the region of investigation 20. The tipping in turn causes the nuclei to precess thereby inducing the NMR signals in the receiver antennas 25. The NMR signals have at least one characteristic, such as amplitude, $T_1$ or $T_2$, related to the material composition in the region of investigation 20. Thus, by measuring the NMR signals and the azimuthal direction from which the NMR signals were received, a property of the earth formation 4 at a particular location can be determined. The azimuthal direction can be determined by recording the angular position (i.e., the azimuthal direction) of each receiver antenna 25 when each receiver antenna 25 receives the NMR signals.

Figure 3:
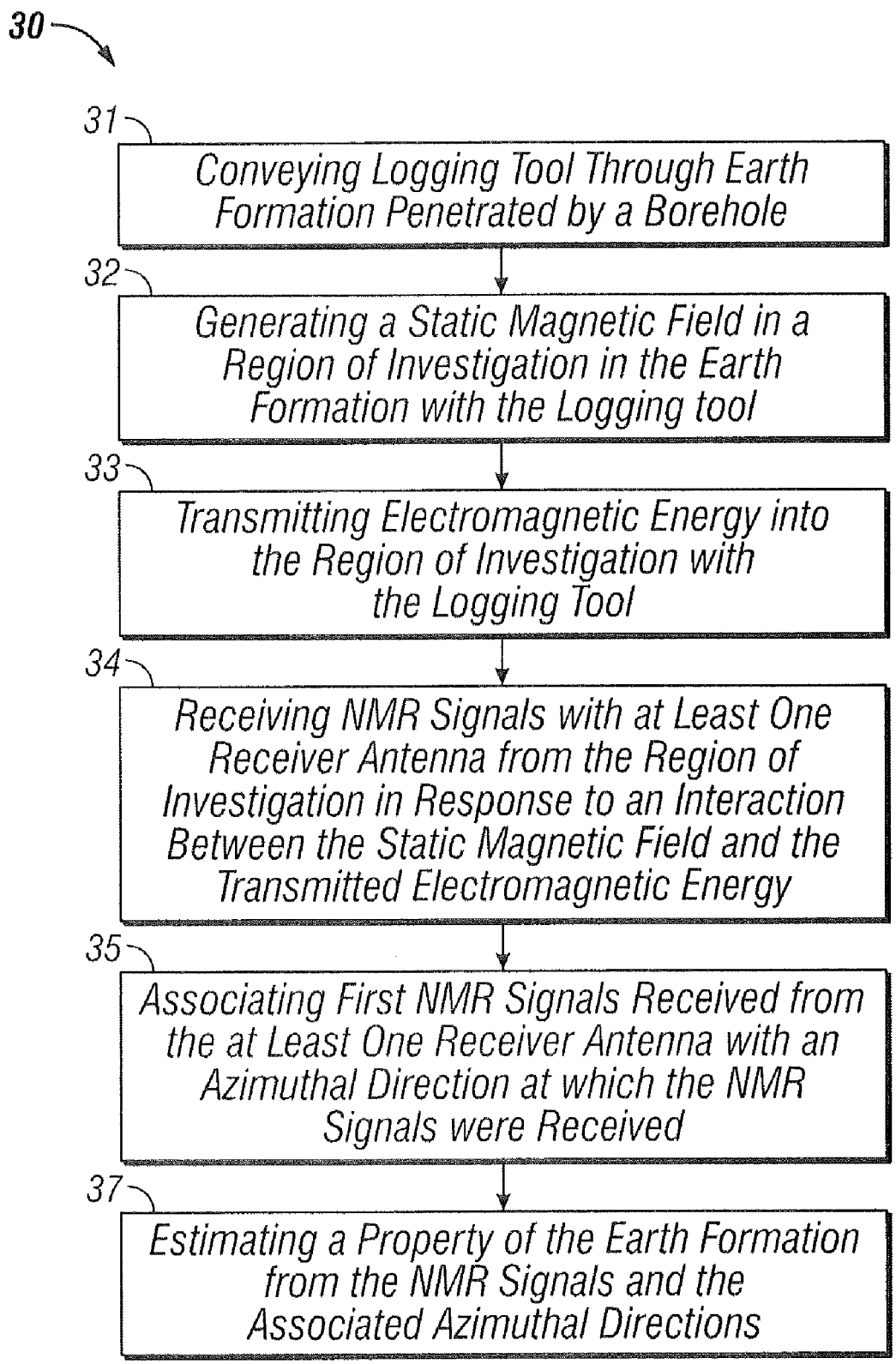
FIG. 3 presents one example of a method for performing the asymmetrical NMR measurements.

FIG. 3 presents an example of a method 30 for estimating a nuclear magnetic resonance (NMR) property of the earth formation 4 penetrated by the borehole 2. The method 30 calls for (step 31) conveying the logging tool 10 through the borehole 2. Further, the method 30 calls for (step 32) generating the static magnetic field $B_0$ in the region of investigation 20 in the earth formation 4 with the logging tool 10, the static magnetic field $B_0$ being configured to polarize the region of investigation 20. Further, the method 30 calls for (step 33) transmitting electromagnetic energy into the region of investigation 20 with the logging tool 10. The electromagnetic energy may be transmitted as a series of CPMG pulses. Further, the method 30 calls for (step 34) receiving NMR signals with at least one receiver antenna 25 from the region of investigation 20 in response to the interaction between the nuclear spins of interest and the static magnetic field and the transmitted electromagnetic energy. In general, the NMR signals are transmitted to the receiving antenna 25 by nuclei precessing in the region of investigation 20 due to the interaction. Further, the method 30 calls for (step 35) associating the NMR signals received the at least one receiver antenna 25 with an azimuthal direction at which the NMR signals were received. Further, the method 30 calls for (step 36) estimating the property from the NMR signals and the associated azimuthal directions. Step 36 can include averaging all NMR signals received from the at least one receiver antenna 25 for a specific azimuthal direction.

In order to increase the resolution of an image derived from the NMR property, the amount of NMR signals or data obtained by each of the receiver antennas 25 will have to increase. Therefore, an image of a bound fluid in the earth formation 4 is a good option. Bound fluids usually have a short $T_1$. Hence, the measurement sequence for the bound fluid can have a short wait time and can be carried out more frequently than a sequence that could measure the entire porosity.

In another embodiment of the logging tool 10, the source 21 can be configured to provide the static magnetic field $B_0$ with an axial gradient (along borehole axis) in the zone of investigation 20. By utilizing frequency sensitive acquisitions of the NMR signals or frequency analysis of the NMR signals, the position of the origination of components of the NMR signals can be determined and allocated in the axial direction. In this embodiment, the axial gradient can be used to increase the resolution of the image in the axial direction along the borehole.

While the embodiment of the logging tool 10 illustrated in FIG. 1 is configured for LWD, the logging tool 10 can also be configured for non-LWD operations. In non-LWD operations, the logging tool 10 can be configured to be conveyed by a wireline, a slickline, or coiled tubing. In one embodiment of the logging tool 10 used for non-LWD operations, the logging tool 10 can be configured to rotate the receiver antenna(s) 25 to provide 360° coverage of the borehole 2. In another embodiment of the logging tool 10 used for non-LWD operations, the logging tool 10 can have one or more stationary receiver antenna(s) 25 configured to provide the 360° coverage of the borehole 2.

In support of the teachings herein, various analysis components may be used, including a digital system and/or an analog system. For example, the electronic unit 7 or the processing system 8 may include the digital and/or analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a nuclear magnetic resonance (NMR) property of an earth formation penetrated by a borehole, the apparatus comprising:
a logging tool;
a source of a static magnetic field, the source being disposed at the logging tool and configured to polarize the region of investigation in the earth formation;
a transmitter antenna disposed at the logging tool and configured to transmit electromagnetic energy into the region of investigation;
a first receiver sensor disposed at the logging tool and configured to receive first NMR signals in an azimuthal direction with respect to a longitudinal axis of the logging tool from the region of investigation in response to an interaction between the static magnetic field and the transmitted electromagnetic energy;
a second receiver sensor disposed at the logging tool and configured to receive second NMR signals in an azimuthal direction with respect to the longitudinal axis of the logging tool from the region of investigation in response to an interaction between the static magnetic field and the transmitted electromagnetic energy; and
a processor configured to:
receive the first NMR signals from the first receiver sensor;
associate the first NMR signals with a first azimuthal direction at which the first NMR signals were received;
receive the second NMR signals from the second receiver sensor;
associate the second NMR signals with a second azimuthal direction at which the second NMR signals were received, wherein second azimuthal direction is different from the first azimuthal direction; and
estimate the property from the first and second NMR signals and the associated azimuthal directions at which the first and second NMR signals were received.

2. The apparatus of claim 1, wherein the processor is further configured to associate a distance from the borehole to the region of investigation with the first or second NMR signals received from the region of investigation and including the distance in the property.

3. The apparatus of claim 1, wherein the processor is further configured to associate the first or second NMR signals with a depth in the borehole at which the first or second NMR signals were received and including the depth in the property.

4. The apparatus of claim 1, wherein the static magnetic field in the region of investigation is substantially perpendicular to a longitudinal axis of the logging tool.

5. The apparatus of claim 1, wherein a magnetic field generated by the electromagnetic energy transmitted into the region of investigation is substantially parallel to a longitudinal axis of the logging tool.

6. The apparatus of claim 1, wherein a receiving field associated with each receiver sensor is substantially perpendicular to:
the static magnetic field in the region of investigation; and
a magnetic field in the region of investigation generated by the transmitted electromagnetic energy.

7. The apparatus of claim 1, wherein the source of the static magnetic field comprises a permanent magnet.

8. The apparatus of claim 1, wherein the transmitter antenna comprises a transmitter winding wrapped around a cylindrical core that is concentric to a longitudinal axis of the logging tool, the transmitter winding having an axis substantially parallel to a longitudinal axis of the logging tool.

9. The apparatus of claim 1, wherein the first or second receiver sensor comprises a receiver winding wrapped around a receiver core having a longitudinal axis that is oriented as a tangent to a circumference of the logging tool.

10. The apparatus of claim 9, wherein the receiver core comprises a shape configured to be sensitive to a sensitive volume in the region of investigation.

11. The apparatus of claim 1, wherein the first or second receiver sensor comprises as least one of an antenna, an inductive coil, a magnetic sensor, and an atomic magnetometer.

12. The apparatus of claim 1, wherein the processor is further configured to display the property as an image with a 360-degree representation about the borehole.

13. The apparatus of claim 12, wherein the image is of a bound fluid of the earth formation.

14. The apparatus of claim 12, wherein the image is at least one of porosity of the earth formation, a boundary between two layers of the earth formation, a longitudinal relaxation time constant $T_1$, and a transverse relaxation time constant $T_2$.

15. The apparatus of claim 1, wherein orientations of the transmitter antenna and the at least one receiver sensor are configured to decouple the transmitter antenna from the at least one receiver sensor.

16. The apparatus of claim 1, wherein the logging tool is configured to be conveyed by at least one of a drill string, a wireline, a slickline, and coiled tubing.

17. A method for estimating a nuclear magnetic resonance (NMR) property of an earth formation penetrated by a borehole, the method comprising:
conveying a logging tool through the borehole;
generating a static magnetic field in a region of investigation in the earth formation with the logging tool;
transmitting electromagnetic energy into the region of investigation with the logging tool;
receiving first NMR signals in a first azimuthal direction with respect to a longitudinal axis of the logging tool with a first receiver sensor disposed at the logging tool from the region of investigation in response to an interaction between NMR spins and the static magnetic field and the transmitted electromagnetic energy;
receiving second NMR signals in a second azimuthal direction with respect to the longitudinal axis of the logging tool with a second receiver sensor disposed at the logging tool from the region of investigation in response to an interaction between NMR spins and the static magnetic field and the transmitted electromagnetic energy, wherein the second azimuthal direction is different from the first azimuthal direction;
associating the first NMR signals with the first azimuthal direction and the second NMR signals with the second azimuthal direction; and
estimating the property from the first and second NMR signals and the associated azimuthal directions at which the first and second NMR signals were received.

18. The method of claim 17, further comprising:
associating a distance from the borehole to the region of investigation with the first or second NMR signals received from the region of investigation; and
including the distance in the property.

19. The method of claim 17, further comprising:
associating the first or second NMR signals with a depth in the borehole at which the first or second NMR signals were received; and
including the depth in the property.

20. The method of claim 17, further comprising displaying the property as an image with a 360-degree representation about the borehole.

21. A non-transitory machine-readable medium comprising machine-executable instructions for estimating a nuclear magnetic resonance (NMR) property of an earth formation penetrated by a borehole having a logging tool disposed therein by implementing a method comprising:
receiving first NMR signals in a first azimuthal direction with respect to a longitudinal axis of the logging tool with a first receiver sensor disposed at the logging tool from a region of investigation in the earth formation;
receiving second NMR signals in a second azimuthal direction with respect to a longitudinal axis of the logging tool with a second receiver sensor disposed at the logging tool from the region of investigation, wherein the second azimuthal direction is different from the first azimuthal direction;
associating the first NMR signals with the first azimuthal direction and the second NMR signals with the second azimuthal direction; and
estimating the property from the first and second NMR signals and the associated azimuthal directions at which the first and second NMR signals were received.

* * * * *